United States Patent Office 3,533,853
Patented Oct. 13, 1970

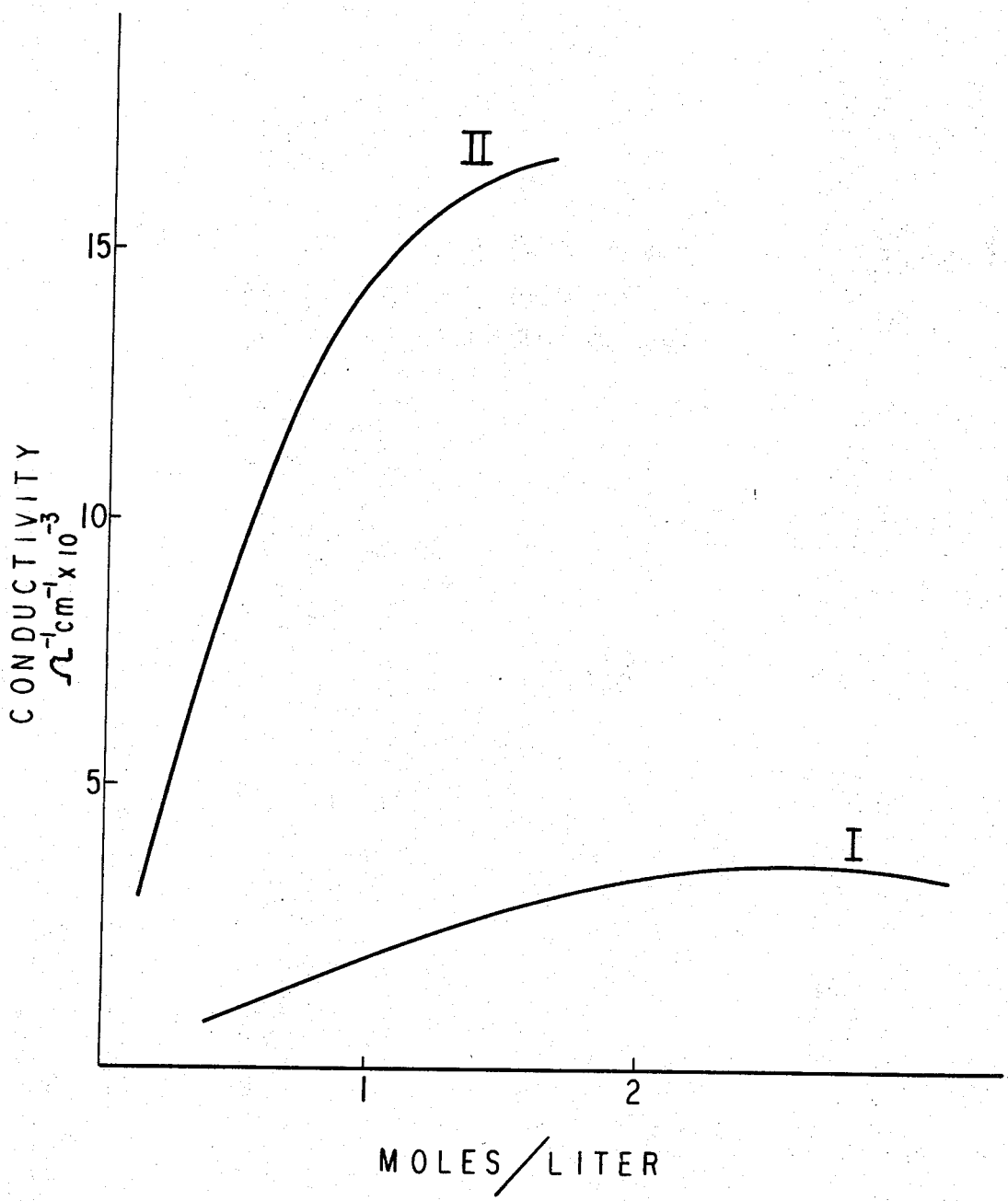

3,533,853
SECONDARY ELECTROCHEMICAL GENERATORS
Jean-Paul Gabano, Poitiers, France, assignor to Société des Accumulateurs Fixes et de Traction (Société Anonyme), Romainville, France, a French company
Filed Dec. 26, 1967, Ser. No. 695,311
Claims priority, application France, Dec. 30, 1966, 89,646, Patent 1,516,899
Int. Cl. H01m 43/06
U.S. Cl. 136—155      5 Claims

---

ABSTRACT OF THE DISCLOSURE

Secondary electrochemical generators containing ionized non-aqueous electrolyte constituted by an aprotic organic solvent of the Lewis base type in which there is dissolved an ionizable addition complex derived from reacting said solvent with an inorganic compound of Lewis acid type and the reaction product thereof with an inorganic salt whose anion is the same as that of said compound and said generators also including a negative electrode whose active material in the charged state is constituted by one or several strongly reactive metals.

---

RELATED APPLICATIONS

A related application by the same inventor entitled Method of Preparing Non-Aqueous Electrolytes Particularly For Primary Generators, The Electrolytes Resulting From Said Method and Primary Generators Containing the said Electrolyte and filed concurrently herewith on Dec. 26, 1967 under Ser. No. 693,320 is copending.

SUMMARY OF INVENTION

The present invention relates to secondary electrochemical generators. The generator according to the invention is more especially remarkable in that it contains an ionized non-aqueous electrolyte and comprises a negative electrode whose active material is made of one or several strongly reactive metals in the charged state.

According to another feature of the invention, the said electrolyte is constituted by an aprotic inorganic solvent in which is dissolved an ionizable addition complex made of an inorganic compound and an inorganic salt, having one constituent in common but their other constituents being different, the other constituent of the said salt being compulsorily formed by the reactive metal which constitutes the negative active material in the charged state.

According to another feature of the invention, the said addition complex is constituted partly by an inorganic compound able to form an addition complex with the said solvent, the stability of this complex being however, lower than that of the addition complex formed by the said inorganic compound and the said inorganic salt.

According to an embodiment, the reactive metal is lithium or a similar metal.

According to the invention, the constituent common to the said inorganic compound and to the said inorganic salt forming the said second addition complex is either chlorine, or fluorine or other halogen or any other species conferring similar properties to the complex.

According to another feature of the invention, the second constituent of the said inorganic compound is boron, phosphoruos, aluminum or other species conferring similar properties to the complex, i.e. having atoms able to accept electron doublets, and therefore being of the Lewis acid type.

According to the invention, the aprotic organic solvent may be tetrahydrofuran, tetrahydrofurfuryloxytetrahydrofuran, the dimethyl ether of diethylene glycol, N-methyl-2-pyrrolidone, dimethoxyethane, dimethoxymethane, or similar liquids whose molecules are able to provide electron doublets and as a consequence, are of the Lewis base type.

The great interest of such secondary generators lies in the fact that their negative electrodes can be constituted by a strongly reactive metal which could not be used in an aqueous electrolyte because of its reaction with water. This would result in an immediate oxidation of the said metal in contact with the water, and consequently in an evolution of hydrogen. However, the use of such strongly reactive metals should be very advantageous in practice.

Among these strongly reactive metals, lithium seems very advantageous on account of its very low atomic weight and the very high value of its oxidation potential.

Many attempts have been made to solve this problem. Up to now, three difficulties have not as yet been satisfactorily mastered. These are:

First, the non-aqueous electrolyte must be ionized so that the current is suitably carried through it, Then the conditions promoting the reversible operation of the negative electrode made of reactive metal must be determined, and Lastly, positive active material must be found, capable of bearing successive charges and discharges without excessive polarization.

It should be specified that by "polarization" is meant the well-known phenomenon reducing the speed of the electrochemical process on account of the accumulation of electrochemical reaction products in the immediate vicinity of the electrode or on the electrode itself, mainly during discharge.

The present invention has among its objects a solution to these problems.

Other objects and features of the invention, are the provision as new industrial products of ionized non-aqueous electrolyte and positive and negative electrodes used in said electrochemical generators.

Other objects and features of the invention will become apparent from the following detailed description and the accompanying drawing wherein the single figure shows two curves plotted with values of conductivity as ordinates and quantities of ionizable complex expressed in moles per liter of tetrahydrofuran, the curves relating respectively to a first complex ($BF_4Li$) and a second complex $AlCl_4Li$.

This invention will be more understood with reference to the following detailed description:

(A) ELECTROLYTE

Up to now, when non-aqueous electrolytes had to be made conductive the general tendency was to make use of the known properties of aqueous electrolytes. These are essentially polar whereas in some non-aqueous electrolytes, particularly of the aprotic type, the actual mechanism lies on bonding between atoms and molecules of non-polar type. In such bonds no electron gain or loss is concerned, but a sharing of electron doublets occurs between two atoms or possibly between two molecules or between an atom and a molecule resulting in a stable arrangement characterized as the case may be, either by an electron octet on the peripheral shell, or by 12 electrons or by 18 electrons.

This explains the failures or the obviously poor results obtained by the use of a salt dissolved in a non-aqueous solvent of organic type. It was erroneously believed that a process similar to that of a dissociation in an aqueous electrolyte of polar type would automatically happen.

In a general way, an appropriate electrolyte can be obtained as follows:

The organic solvent will be hereafter referred to by the letter X, the inorganic compound by $S_1$ and an inorganic salt by $S_2$.

The salt $S_2$ contains a very reactive metal cation. Therefore, the question is essentially to dissolve this salt $S_2$ in the solvent X.

Actually, fairly often this dissolution cannot be directly effected.

According to the invention, a first intermediary step consists in creating addition complexes of the $XS_1$ type between the non-aqueous organic liquid X and the compound $S_1$ by reacting these two. By doing this, great quantities of compound $S_1$ can be dissolved. In this reaction, the soluble addition complex $S_1$ forms generally with the non-aqueous organic liquid X a liquid which is either not conductive, or very slightly so. Then, to this liquid containing the addition complex $XS_1$, is added the salt $S_2$ characterized by the fact that the compound $S_1$ and the salt $S_2$ have a common constituent and that, further, the compound $S_1$ and the salt $S_2$ are able to form a second addition complex $S_1S_2$ more stable than the initial soluble addition complex $XS_1$. Then the second addition complex $S_1S_2$ is formed to the detriment of the complex $XS_1$. Then the said complex $S_1S_2$ becomes ionizable by electron sharing and coupling and the result is the formation of a non-aqueous electrolyte.

The very great interest of this process lies in that the salt $S_2$ may itself be insoluble in the non-aqueous organic liquid X. By the process described, it is possible, however, to dissolve in said solvent X great quantities of the salt $S_2$ which forms with the compound $S_1$ an ionizable addition complex $S_1S_2$.

Thus, the whole becomes conductive i.e. behaves as an electrolyte allowing current transport from one electrode to the other. This electrolyte constituted by complexes confers high energy density to electrochemical generators using strongly reactive negative materials, such as lithium.

(B) EXAMPLES

In Example 1, an organic solvent X able to give electrons, and thus considered as the Lewis base type, can be used. It is the case, for example, of tetrahydrofuran having the following electronic formula:

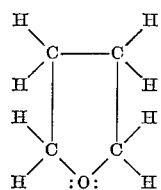

where two electron doublets are shown beside the oxygen; these doublets confer the Lewis base property to tetrahydrofuran.

When Lewis acid compound (as an $S_1$ inorganic compound), i.e. able to accept electrons and more particularly electron doublets, is added to tetrahydrofuran an addition complex $XS_1$ will be formed by electron doublet sharing.

Thus, an inorganic compound $S_1$ such as boron fluoride can be used, for example, resulting from the binding of one boron atom, characterized by three electrons in its peripheral shell, to three fluorine atoms characterized by seven electrons in its peripheral shell. Schematically, the boron fluoride compound can be represented as follows, showing the electron sharing:

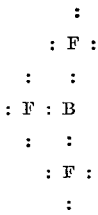

In this formula each fluorine atom has an electron octet on the peripheral shell, whereas two electrons are still missing to the boron atom to complete an octet on the peripheral shell. Therefore, it may be seen that boron fluoride is a Lewis acid type since it can be an acceptor of an electron doublet. If boron fluoride and tetrahydrofuran are put together, an addition complex $XS_1$ will be formed by sharing an electron doublet belonging to tetrahydrofuran. This complex may be represented as follows:

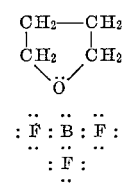

where the boron atom has an electron octet in its peripheral shell.

In practice when tetrahydromuran and boron fluoride are in contact an addiiton complex $XS_1$ is formed but the reaction is highly exothermal so that the mixture must be cooled.

The resulting liquid is not conductive; it is therefore necessary to make it conductive. Therefore, it is necessary to apply the method according to the invention. In other words, the complex $XS_1$, i.e. in this example tetrahydrofuran-boron fluide complex, must be decomposed and another complex must be formed by using a second salt. The latter should be able to form with the compound $S_1$ an addition complex more stable than $XS_1$.

According to the invention, since the compound designated by $S_1$ is a fluoride, the salt $S_2$ must be another fluoride, such as lithium fluoride. Boron fluoride and lithium fluoride being able to form an addition complex more stable than the boron tetrahydrofuran complex $XS_1$, the latter will be modified by the adjunction of lithium fluoride and a new complex $S_1S_2$ will be formed where the boron atom has again a complete electron octet on the peripheral shell. This new addition complex $S_1S_2$ may be shown as follows:

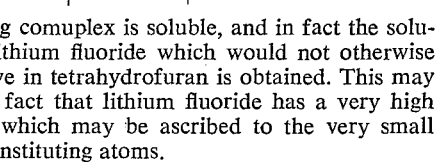

The resutling comuplex is soluble, and in fact the solubilization of lithium fluoride which would not otherwise directly dissolve in tetrahydrofuran is obtained. This may be due to the fact that lithium fluoride has a very high lattice energy which may be ascribed to the very small radius of its constituting atoms.

It should be noted that in the boron fluoride $BF_3$ all bonds are covalent since the fluoride results from a sharing of electron doublets, whereas in the lithium fluoride the bonds are of a ionic type because the single electron in the peripheral shell lithium passes to the peripheral shell of fluorine to form a compound $(F^-Li^+)$.

Now the addition complex $S_1S_2$ of boron fluoride-lithium fluoride having a complete electron octet surrounding the boron atom through the surrounding arrangeemnt of four fluorine atoms, the electron octet is complete, but the group

acquires a negative charge by ionic bonding, the lithium having given up its single electron so that between this group and the lithoium an ionic bond takes place in which this group is the anion and lithium is the cation. This complex can be written as follows:

$$(BF_4)^- Li^+$$

This complex dissolves in the tetrahydrofuran because the lattice energy is low since the size of the group $BF_4$ is large.

Therefore it may be seen that, according to the invention, a salt insoluble in tetrahydrofuran, such as lithium fluoride, can be dissolved due to the formation of an ionized complex having a low lattice energy and permitting a subsequent solvation.

Actually the changes described hereabove are thus not completed. The boron fluoride lithium fluoride complex is ionized as anion $BF_4^-$ and cation $Li^+$, each of these ions being solvated in turn by fixing a number of moles of the solvent X to give $(n'X)BF_4^+$ and $(nX)Li^+$, where $n$ and $n'$ are integers and $n>n'$ since the solvent being a Lewis base, the acid type (lithium) cation will solvate more readily.

The process according to the invention comprises therefore the following steps:

dissolution
ionization
solvation
dissociation the two last steps being practically simultaneous. Eventually, a conductive solution is obtained.

During the preparation of the conductive non-aqueous solution according to the invention, tetrahydrofuran tends to polymerize in contact with boron fluoride $BF_3$ under the effect of traces of water. To avoid this, it is advantageous to add to the liquid a small quantity of pyridine and an amount of 1% has been found very effective.

EXAMPLE 2

Instead of fluorine, chlorine may be used. In this case, aluminum chloride can be used as inorganic compound $S_1$ instead of boron fluoride. This would imply the use of lithium chloride as salt $S_2$.

Aluminum chloride may be represented as follows:

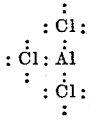

since the aluminum atom bears three electrons on its peripheral shell and the chlorine atom seven electrons. Each chlorine atom in aluminum chlorine is surrounded by an electron octet whereas an electron doublet is missing in the aluminum atom. Therefore, aluminum chloride has a Lewis acid chartcteristic since it can accept an electron doublet. Tetrahydrofuran and aluminum chloride are able to form an addition complex $XS_1$ of the following form:

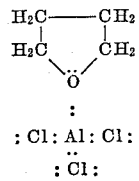

Lithium chloride being able to form with aluminum chloride an addition complex $S_1S_2$ more stable than the aluminum chloride tetrahydrofuran complex $XS_1$ will replace the latter to form a new addition complex $S_1S_2$.

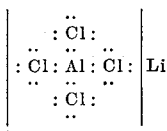

where lithium is bonded to the $AlCl_4^-$ group by an ionic bond so that anion $AlCl_4^-$ and cation $Li^+$ are formed, and are solvated in turn, the solvation of the action being more developed.

The process according to the invention comprises here again the following steps:

dissolution
ionization
solvation
dissociation

Therefore, the new solution is conductive, as has been confirmed experimentally.

Example 3

It has been found that the electrolyte according to the invention could be improved by using an excess of the inorganic compound $S_1$, which is boron fluoride or aluminum chloride in the two previous examples. Therefore, the electrolyte finally comprises the tetrahydrofuran, the ionizable complex $BF_4Li$ or $AlCl_4Li$ and, as the case may be, $BF_3$ or $AlCl_3$ in excess.

Example 4

Other fluorinated compounds can be used as $S_1$ compound, such as phosphorus pentafluoride $PF_5$ whose peripheral shell contains five electrons. For electron doublet sharing between one phosphorus atom and five fluorine atoms, each fluorine atom will be surrounded with an electron octet but the phosphorus atom will have ten electrons (five originally and five from common sharing with fluorine atoms). In this case, the stable arrangement of the peripheral shell comprises 12 electrons, so that the phosphorus is able to accept one more electron doublet.

The corresponding arrangement may be represented as follows:

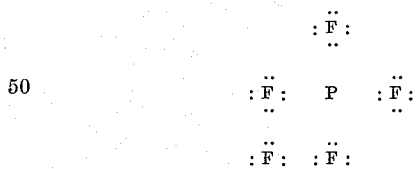

Example 5

N-methyl-2-pyrrolidone may be used as solvent X:

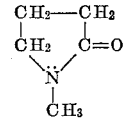

The available electron doublet belongs to the nitrogen atom.

As $S_1$ compound, the above cited compounds may be used, i.e. $BF_3$, $AlCl_3$ and $PF_5$.

As $S_2$ salt, FLi may be used when $S_1$ contains fluorine, or ClLi when $S_1$ contains chlorine.

Example 6

Dimethoxyethane (or glycoldimethylethane) may also be used as solvent X:

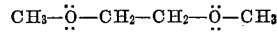

The electron doublets which can be donated belong to the two oxygen atoms. The compounds $S_1$ and $S_2$ may be the same as above mentioned.

Example 7

Dimethoxymethane may be used as the solvent X.

where the electron doublets which can be donated belong to the oxygen atoms. $S_1$ and $S_2$ are as above.

Example 8

Tetrahydrofurfuryloxytetrahydrofuran may also be used,

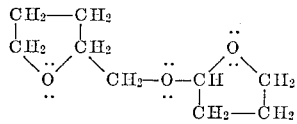

where the electron doublets which can be donated are on the three oxygen atoms. $S_1$ and $S_2$ are the same as above.

Example 9

Diethyleneglycol dimethylether or diglyme may be used

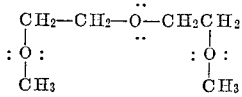

where the electron doublets which can be donated are on the three oxygen atoms. $S_1$ and $S_2$ are the same as above.

In the drawing two curves are shown. Abscissae are the quantities of the ionizable complex expressed in moles per liter of tetrahydrofuran, whereas ordinates are the values of the conductivity.

The curve I is related to the use of ($BF_4Li$) complex whereas the curve II is related to the use of ($AlCl_4Li$) complex.

(C) ELECTRODES FOR THE GENERATORS

Positive electrodes

As a positive electrode, the active material should be constituted by a metal compound having an anion identical to the anion which is common to the $S_1$ inorganic compound and the $S_2$ inorganic salt which form the complex that is ionized in the electrolyte. Thus, in the case of an electrolyte containing fluorides, a metal fluoride should be used as positive active material, being, for example, nickel or copper fluoride.

When the electrolyte according to the invention comprises chlorides, a metal chloride should be used as positive active material, for example, silver chloride.

A very particular interest feature of the said active material according to the present invention will now be explained below:

A reversible electrode can be developed by using it in a dissolved form in one of its states. The product of the direct electrochemical reaction being soluble will not tend to polarize the corresponding electrode during the reaction. During the opposite electrochemical reaction this product will be again deposited on the corresponding electrode, provided that the potential of the said electrode has such a value that no action occurs either on the non-aqueous electrolyte or on its constituents.

On the other hand, it has been seen that a metal salt $S_2$, even normally insoluble in the organic liquid X, can be nevertheless dissolved provided that an addition complex $S_1S_2$ can be obtained by displacing X from the complex $XS_1$ previously formed as described herein.

Besides, according to the present invention, it has been recommended to use an electrolyte of the type $X+XS+S_1S_2$.

If the positive active material is such that during the discharge the compound $S_2$ is formed with the oxidized lithium, this compound $S_2$ could dissolve owing to the presence of the first addition complex $XS_1$. Now such a process does occur when a metal fluoride is used as active material, for example, nickel fluoride in an electrolyte containing fluorinated complexes. The discharge products are then lithium in oxidized state and fluorine in reduced state, and they just constitute lithium fluoride which becomes soluble when forming a complex with boron fluoride.

Similarly, silver chloride can be used as positive active material in the case of an electrolyte with chlorinated complexes. The discharge products are lithium in oxidized state and chlorine in reduced state, constituting lithium chloride, which is able to form, as it has been seen, an addition complex aluminum chloride-lithium chloride which is soluble.

Conversely, during the charge, the lithium being ionically bonded can deposit on the negative electrode whereas fluorine and chlorine anions respectively form fluoride and chloride with the metals constituting the carrier of the positive electrodes i.e. nickel in the first case or silver in the second case.

Negative electrodes

As for the negative electrode, its active material in the charged state should be constituted by a metal identical with the cation of the addition complex $S_1S_2$.

Reactions in the generator

The discharge and charge reactions of the electrochemical generator may be schematically represented as follows by using stoichiometric quantities for active material and some of the electrolyte constituents. The abbreviation THF will indicate tetrahydrofuran.

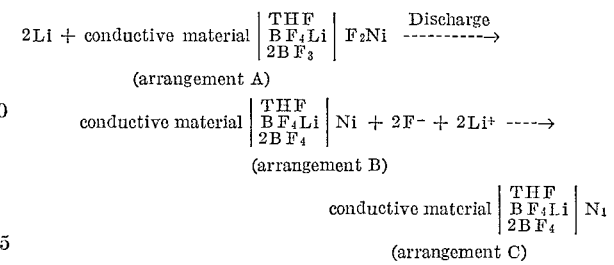

In the initial arrangement A, the electrodes are in the charged state and the electrolyte is that of the instant invention. During the discharge, lithium is oxidized to $Li^+$ by loss of its peripheral electron and the fluorine of the nickel fluoride is reduced to $F^-$ by acquiring a supplementary electron, as shown in the arrangement B. As these ions gradually appear during discharge, they constitute the lithium fluoride compound FLi, which combines with boron fluoride $BF_3$ to form a soluble addition complex $BF_4Li$ (arrangement C) where nickel metal remains at the positive electrode and an appropriate conductive material, for example, nickel, remains at the negative electrode.

Particularly, the electrolyte contains the ionized addition complex $BF_4Li$, the bond between lithium and $BF_4$ group being ionic.

During the charge this ionized complex gives to the negative electrode the ion $Li^+$ which is reduced to metallic lithium by acquiring an electron. This lithium deposits on the conductive carrier. On the positive electrode a fluorine ion $F^-$ in the anionic group $BF_4^-$ is oxidized by loosing one electron. The formed fluorine fluorinates the nickel of the positive electrode. The boron fluoride $BF_3$ goes back to the electrolyte.

It is well understood that non-stoichiometric quantities can be used for the reacting species. In this case, the capacity of the electrochemical generator according to the invention will be limited by the reacting species present in the smallest relative quantity. It must be stated that the compound BF₃ has an active part to obtain the capacity; it disappears during the discharge and regenerates during the charge.

Discharge and charge reaction can be similarly represented when the positive material is constituted by silver chloride ClAg.

According to the invention, the electrolyte then comprises THF, addition complex AlCl₄Li and aluminum chloride Cl₃Al. All reacting species are represented in stoichiometric quantities.

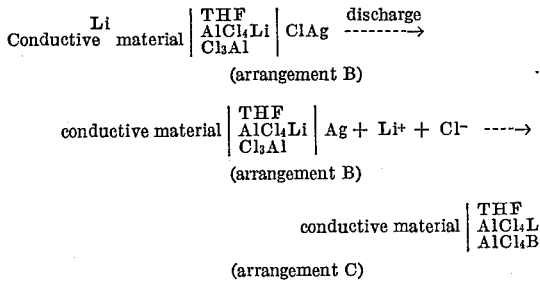

(arrangement B)

(arrangement B)

(arrangement C)

During the discharge, the lithium of the negative electrode is oxidized to Li⁺ by loosing its peripheral electron, whereas at the positive electrode chlorine from silver chloride is reduced to Cl⁻ by fixing a peripheral electron. The resulting lithium chloride combines with aluminum chloride Cl₃Al to form a soluble addition complex which is ionized, the bond between lithium and Cl₄Al group being ionic.

During the charge, the ion Li⁺ is reduced at the negative electrode by fixing an electron whereas a chlorine ion from the anionic group AlCl₄⁻ is oxidized by loosing an electron. The so-obtained chlorine will form chloride with the silver carrier of the positive electrode.

The compound Cl₃Al regenerated during the charge goes back to the electrolyte.

Non-toichiometric quantities can be used for the reacting species.

While specific embodiments of the invention have been disclosed, variations within the scope of the appended claims are possible and are contemplated. There is no intention, therefore, of limitation to the exact abstract or disclosure herein prescribed.

What is claimed is:

1. A secondary cell comprising a positive electrode selected from the group consisting of copper fluoride, nickel fluoride and silver chloride, an alkali metal negative electrode and a non-aqueous conductive electrolyte consisting solely of tetrahydrofuran as an organic solvent together with a complex selected from the group consisting of metallic fluoroborates and tetrachloroaluminates, together with a complex which is a reaction product of an inoragnic compound selected from the group consisting of boron fluoride and aluminum chloride and said sole organic solvent, the halogen of the positive electrode being the same as the halogen of the complex salt and the last-named compound.

2. A secondary cell according to claim 1, wherein said negative electrode is lithium.

3. A secondary cell according to claim 1, wherein the complex salt is lithium-tetrafluoroborate, the compound is boron fluoride, the negative electrode is lithium and the positive electrode is selected from the group consisting of nickel fluoride and copper fluoride.

4. A secondary cell according to claim 1, wherein the complex salt is lithium-tetrachloroaluminate, the compound is aluminum chloride, the negative electrode is lithium, and the positive electrode is silver chloride.

5. In a secondary electrochemical generator including a positive electrode selected from the group consisting of nickel fluoride, copper fluoride and silver chloride and a lithium negative electrode, a non-aqueous electrolyte consisting solely of tetrahydrofuran as an aprotic organic solvent together with a complex salt selected from the group consisting of metallic fluoroborates and tetrachloroaluminates, together with a reaction product of an inorganic compound selected from the group consisting of boron fluoride and aluminum chloride and said sole organic solvent, and wherein the complex salt and said last-named compound have the same anion and different cations, and wherein the anions of the positive electrode are the same as those of said salt and said compound.

References Cited

UNITED STATES PATENTS

| | | | |
|---|---|---|---|
| 3,393,093 | 7/1968 | Shaw et al. | 136—155 XR |
| 3,404,042 | 10/1968 | Forster et al. | 136—6 XR |
| 3,415,687 | 12/1968 | Methlie | 136—155 XR |
| 3,423,242 | 1/1969 | Meyers et al. | 136—154 XR |
| 3,468,716 | 9/1969 | Eisenberg | 136—154 XR |

OTHER REFERENCES

Hill et al.: Research and Development of a High Capacity, Nonaqueous Battery, prepared for NASA on Aug. 15, 1965, Contract No. NAS 3–2780, pp. 1–4 and 109–126.

DONALD L. WALTON, Primary Examiner

PO-1050
(5/69)

UNITED STATES PATENT OFFICE
CERTIFICATE OF CORRECTION

Patent No. 3,533,853  Dated Oct. 13, 1970

Inventor(s) Jean-Paul Gabano

It is certified that error appears in the above-identified patent and that said Letters Patent are hereby corrected as shown below:

Column 1, line 69, correct spelling of "phosphorus";

Column 4, line 32, correct spelling of "tetrahydrofuran";
line 33, correct spelling of "addition";
line 40, "fluide" should be ---fluoride---;
line 61, "comuplex" should be --complex---;
line 72, "of" should appear after "shell".

Column 5, line 9, correct spelling of "lithium";
line 27, "$BF_4^+$" should read ---$BF_4^-$---;
line 60, "chlorine" (second occurrence) should read ---chloride---;
line 64, correct spelling of "characteristic".

Column 6, line 12, "action" should read --cation--;

Column 7, line 6 in the equation "$CH_3$" (second occurrence should read ---$CH_2$---;
line 16, in the equation "$CH_2$" (second occurrence) should read ---CH---;
line 74, "XS" should read ---$XS_1$---;

Column 8, line 40, "$2BF_4$" should read --$2BF_3$--;
line 44, "Li" should appear after "2 $BF_4$".

Column 9, line 5, "active" should appear after "positive";
line 20, "Bi" should be ---Li---;
line 38, correct spelling of "stoichiometric";

Column 10, line 4, correct spelling of "inorganic".

SIGNED AND
SEALED
JAN 5 1971

(SEAL)
Attest:

Edward M. Fletcher, Jr.
Attesting Officer

WILLIAM E. SCHUYLER, JR.
Commissioner of Patents